United States Patent Office 2,826,603
Patented Mar. 11, 1958

2,826,603

PROCESS FOR PREPARING 3,3-DICHLORO-2-METHALLYL SUBSTITUTED MALONATES

Donald G. Kundiger and Louis E. Ott, Manhattan, Kans., assignors to The Dow Chemical Company, Midland, Mich., a corporation of Delaware No Drawing. Application August 6, 1956
Serial No. 602,431

1 Claim. (Cl. 260—485)

This invention is concerned with substituted malonic esters and is particularly directed to dichloromethylallyl-malonates having the formula

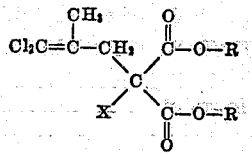

wherein R represents an alkyl radical containing from 1 to 4 carbon atoms, inclusive, and X represents hydrogen, a 3,3-dichloro-2-methylallyl radical or an alkyl radical containing from 1 to 4 carbon atoms, inclusive, and to a method for their preparation.

The new compounds are viscous liquids or crystalline solids soluble in many organic solvents and of low solubility in water. They have been found useful as intermediates for the preparation of a variety of organic compounds and particularly for the preparation of dichloro-methylallyl-barbituric acid compounds. The latter are disclosed and claimed as new chemical compounds useful as fungicides in a co-pending application, Serial No. 602,432, filed concurrently herewith.

The compounds of the invention may be prepared by various methods. In one mode of operation 1,1,3-trichloro-2-methyl-1-propene is reacted with a dialkyl malonate in the presence of an alkali metal alkoxide. In general, approximately equimolecular proportions of the dialkyl malonate and 1,1,3-trichloro-2-methyl-1-propene are mixed together in a reaction solvent such as an anhydrous alkanol and heated in the presence of at least an equimolecular proportion of an alkali metal alkoxide for a period of time at temperatures of from about 50° to 120° C. On completion of the reaction, the desired product may be isolated and purified by conventional procedures such as fractional distillation under reduced pressure and recrystallization.

In a preferred method for preparing the compounds of the invention, a dialkyl malonate having the formula

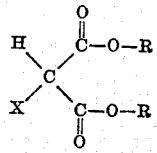

wherein R and X have the aforementioned significance, is reacted with 3,3,3-trichloro-2-methyl-1-propene in the presence of a sodium alkoxide. In such mode of operation, it is preferred to employ approximately equimolar proportions of the malonate and trichloro-methyl-propene reactants together with at least an equimolar amount of sodium alkoxide. Good results have been obtained when the 3,3,3-trichloro-2-methyl-1-propene reactant is added portionwise to a mixture of the dialkyl malonate and sodium alkoxide in an anhydrous alkanol. In such reaction, it is preferred to employ the alkoxide and alkanol corresponding to the alkyl groups on the dialkyl malonate. Following the above addition, the reaction mixture is heated for a period of time at temperatures of from about 30° to about 100° C. to complete the reaction. Thereafter, unreacted starting materials are recovered and the desired product separated by fractional distillation under reduced pressure.

Where the dialkyl malonate bears two active hydrogens, that is when X represents hydrogen in the above formula, a mixture of mono- and di-(3,3-dichloro-2-methylallyl) substituted malonate products may be obtained. Such products are readily separated by fractional distillation. If the 2,2-di(3,3-dichloro-2-methylallyl)-malonate is desired as a major product one molar proportion of the dialkyl malonate reactant is reacted with at least two molar proportions of 3,3,3-trichloro-2-methyl-1-propene in the presence of at least two molar proportions of sodium alkoxide.

The following examples illustrate the invention but are not to be construed as limiting the same.

Example 1

25.3 grams (1.1 moles) of sodium was added portionwise with stirring to 500 milliliters of anhydrous ethanol. Reaction ensued with the production of a solution of sodium ethoxide in anhydrous ethanol. To this solution, 158.3 grams (0.995 mole) of diethyl malonate was added portionwise with stirring and the resulting mixture heated to a temperature of 80° C. under reflux. To the above heated mixture, 159.5 grams (1 mole) of 3,3,3-trichloro-2-methyl-1-propene was added portionwise with stirring. Heating at 80° C. was continued for a total of 4.25 hours. Thereafter the reaction mixture was fractionally distilled to separate a diethyl 2-(3,3-dichloro-2-methylallyl)-malonate product as a liquid boiling at from 95° C. under 0.2 millimeter pressure to 100° C. under 0.3 millimeter pressure and having a refractive index (n/D) of 1.467 at 20° C. The residue from the distillation solidified on standing and was recrystallized from absolute alcohol to obtain a diethyl 2,2-di(3,3-dichloro-2-methylallyl)-malonate product as a crystalline solid, melting at 66°–67° C.

Example 2

Following the procedure of the preceding example, 25.8 grams (1.13 moles) of sodium was dissolved in 500 milliliters of absolute ethanol and to the resulting mixture 197.4 grams (1.13 moles) of diethyl 2-methyl-malonate and 192.5 grams (1.21 moles) of 3,3,3-trichloro-2-methyl-1-propene were added successively and portionwise with stirring during a period of 2.25 hours, while maintaining the mixture at 25°–30° C. The reaction mixture was then heated at a temperature of 80° C. under reflux for 2.5 hours. Thereafter the crude reaction product was fractionally distilled to recover solvent and unreacted starting materials and to obtain a diethyl 2-methyl-2-(3,3-dichloro-2-methylallyl)-malonate as a liquid boiling at from 96° C. under 0.3 millimeter pressure to 110° C. under 1.1 millimeters pressure and characterized by a refractive index (n/D) of 1.468 at 20° C.

Example 3

62 grams (2.7 gram-atoms) of sodium was dissolved in 800 milliliters of anhydrous ethanol to prepare a solution of sodium ethoxide. To this solution, 489 grams (2.6 moles) of diethyl 2-ethyl-malonate are added portionwise with stirring. To the resulting mixture, 428 grams (2.7 moles) of 3,3,3-trichloro-2-methyl-1-propene was added portionwise with stirring over a period of 45 minutes. The addition of the trichloro-methyl-propene was initiated with the mixture at a temperature of 53° C. Exothermic reaction ensued and the temperature of the reaction mixture rose to 85° C. without external heating.

During the latter stages of the addition of the trichloro-methyl-propene, cooling of the reaction mixture was employed to avoid an excessive rate of reaction. After all the trichloro-methyl-propene had been added, the mixture was maintained at the boiling temperature under reflux for 1.5 hours to complete the reaction. Thereafter, the crude product was fractionally distilled under reduced pressure to obtain a diethyl 2-(3,3-dichloro-2-methylallyl)-2-ethyl-malonate as a colorless liquid boiling at from 110° C. under 0.5 millimeter pressure to 121° C. under 1.2 millimeters pressure and characterized by a refractive index (n/D) of 1.471 at 20° C.

In a similar fashion, equimolar proportions of sodium butoxide and dibutyl 2-butyl-malonate are reacted with an equimolar proportion of 3,3,3-trichloro-2-methyl-1-propene in anhydrous butanol solution to produce dibutyl 2-(3,3-dichloro-2-methylallyl)-2-butyl-malonate. In like manner 3,3,3-trichloro-2-methyl-1-propene is reacted with dimethyl malonate and with dipropyl malonate in the presence of a sodium alkoxide to produce dimethyl 2-(3,3-dichloro-2-methylallyl)-malonate and dipropyl 2-(3,3-dichloro-2-methylallyl)-malonate, respectively.

We claim:
A method for the preparation of a dichloromethylallyl-malonate of the formula

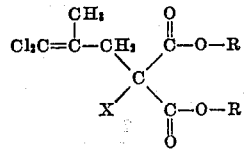

wherein R represents an alkyl radical containing from 1 to 4 carbon atoms and X is selected from the group consisting of hydrogen, a 3,3-dichloro-2-methylallyl radical and alkyl radicals containing from 1 to 4 carbon atoms, inclusive, which comprises reacting a malonic ester of the formula

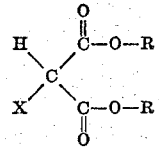

wherein R and X are as above, with 3,3,3-trichloro-2-methyl-1-propene at a temperature of from 30° to about 100° C. in the presence of a sodium alkoxide.

References Cited in the file of this patent
UNITED STATES PATENTS

| | | |
|---|---|---|
| 2,613,221 | Ladd et al. | Oct. 7, 1952 |
| 2,617,722 | Mowry et al. | Nov. 11, 1952 |
| 2,667,505 | Ladd et al. | Jan. 26, 1954 |